(12) United States Patent
Silverstein et al.

(10) Patent No.: US 11,275,716 B2
(45) Date of Patent: Mar. 15, 2022

(54) COGNITIVE DISPARATE LOG ASSOCIATION

(71) Applicant: INTERNATIONAL BUSINESS MACHINES CORPORATION, Armonk, NY (US)

(72) Inventors: Zachary A. Silverstein, Austin, TX (US); Kelly Camus, Durham, NC (US); Tiberiu Suto, Franklin, NY (US); Andrew R. Jones, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 179 days.

(21) Appl. No.: 16/883,306

(22) Filed: May 26, 2020

(65) Prior Publication Data

US 2021/0374103 A1    Dec. 2, 2021

(51) Int. Cl.
| | | |
|---|---|---|
| *G06F 15/16* | (2006.01) | |
| *G06F 16/17* | (2019.01) | |
| *G06F 16/182* | (2019.01) | |
| *G06N 20/00* | (2019.01) | |
| *G06F 16/36* | (2019.01) | |
| *G06K 9/62* | (2022.01) | |
| *G06F 16/31* | (2019.01) | |

(52) U.S. Cl.
CPC ........ *G06F 16/1734* (2019.01); *G06F 16/182* (2019.01); *G06F 16/322* (2019.01); *G06F 16/367* (2019.01); *G06K 9/6256* (2013.01); *G06N 20/00* (2019.01)

(58) Field of Classification Search
CPC .. G06F 16/1734; G06F 16/322; G06F 16/182; G06F 16/367
USPC ........................................................ 709/224
See application file for complete search history.

(56) References Cited

U.S. PATENT DOCUMENTS

| | | | |
|---|---|---|---|
| 5,737,600 A | 4/1998 | Geiner | |
| 5,774,716 A | 6/1998 | Harbinski | |
| 5,999,935 A | 12/1999 | Clark | |
| 6,247,149 B1 | 6/2001 | Falls | |
| 6,317,787 B1 | 11/2001 | Boyd | |
| 6,584,491 B1 | 6/2003 | Niemi | |
| 7,606,814 B2 * | 10/2009 | Deily | G06F 16/9574 |
| 7,739,230 B2 | 6/2010 | Bourne | |
| 8,990,378 B2 | 3/2015 | Caner | |

(Continued)

*Primary Examiner* — Moustafa M Meky
(74) *Attorney, Agent, or Firm* — Schmeiser, Olsen & Watts; Christopher M. Pignato

(57) ABSTRACT

An approach is provided for tracking a single process instance flow. A request is received in a first system of a multi-system environment. Log files are pulled from systems with which the request interacts. Log entries are captured for the request. The log files are combined and flattened into a chronological log. A predictive model is built from an order of entries in the chronological log. Correlation keys in the entries of the chronological log are identified. Logs specifying processing of multiple ongoing requests are aggregated. A process instance of interest to a user is received. Instance specific log files are generated by deflattening the aggregated logs and by using a pattern detection algorithm that uses the predictive model and an alternate identifier algorithm that uses the correlation keys. One of the generated instance specific log files specifies a flow of the process instance of interest.

20 Claims, 8 Drawing Sheets

(56) References Cited

U.S. PATENT DOCUMENTS

| | | |
|---|---|---|
| 2002/0138762 A1 | 9/2002 | Horne |
| 2005/0203952 A1* | 9/2005 | Deily ................. G06F 16/9574 |
| 2015/0347310 A1* | 12/2015 | Ish ..................... G06F 12/0871 |
| | | 711/3 |
| 2018/0337841 A1* | 11/2018 | Muraira ............. H04L 43/0864 |
| 2019/0147080 A1 | 5/2019 | Nikitina |
| 2020/0272349 A1* | 8/2020 | Matsuda ............... G06F 3/0608 |

* cited by examiner

COGNITIVE DISPARATE LOG ASSOCIATION

BACKGROUND

The present invention relates to managing virtualized computing environments, and more particularly to tracking a process instance as the instance moves through multiple systems.

Often a user needs to search through multiple systems to find multiple relevant log files in the process of debugging. In a non-shared environment, the logs are significantly more manageable than in a shared environment where there may be many ongoing requests, integrations, etc., being processed at the same time.

SUMMARY

In one embodiment, the present invention provides a computer-implemented method. The method includes during a training phase receiving, by one or more processors, a single request in a first system of a multi-system computing environment to enact a cognitive module. The method further includes pulling, by the one or more processors and by using the cognitive module, log files from systems with which the single request interacts. The systems are included in the multi-system computing environment. The method further includes capturing, by the one or more processors and by using the cognitive module, log entries for the single request. The method further includes combining and flattening, by the one or more processors and by using the cognitive module, the log files into a single chronological log. The method further includes building, by the one or more processors and by using the cognitive module, a predictive model from an order of entries in the single chronological log. The method further includes identifying correlation keys in the entries of the single chronological log. The method further includes during a live production phase in which requests in multiple process instances are ongoing in the multi-system computing environment, performing steps of aggregating logs specifying a processing of the requests by multiple systems in the multi-system computing environment, receiving an identifier of a process instance of interest to a user, and generating instance specific log files by deflattening the aggregated logs by using a pattern detection algorithm that uses the predictive model and an alternate identifier algorithm that uses the correlation keys, one of the generated instance specific log files specifying a flow of the process instance of interest to the user.

A computer program product and a computer system corresponding to the above-summarized method are also described and claimed herein.

DETAILED DESCRIPTION

Overview

Tracking a request of a single process instance in a computing environment is not guaranteed to retrieve all relevant instance information, especially when the request is moving between multiple systems and multiple logging patterns. A conventional tracking technique that uses only timestamps is not sufficiently robust because, for example, different systems have different timings. Conventional manual techniques of analyzing logs from multiple systems to determine which lines in the logs correlate to which request is error-prone and costly in terms of time and labor.

Embodiments of the present invention address the aforementioned unique challenges by an improved collating of multi-system logs to track a single process instance flow. Embodiments of the present invention track a request while the request moves between multiple systems and between different logging patterns. Embodiments of the present invention utilize cognitive analysis on disparate log files to extract related logs and related files, which facilitate the tracking of a single process instance flow as the process instance moves through multiple systems. In one or more embodiments, the collating of multi-system logs includes using correlation keys in the multiple systems and an ontology tree indicating steps that are expected to occur.

Embodiments of the present invention include a cognitive module that provides an analysis of a single request as it moves through systems to identify (i) the values that change as the request travels through the systems and (ii) other values that remain the same as the request travels through the systems. In one embodiment, multiple fields are used as strong predictors of the values that can be used as correlation keys.

Embodiments of the present invention include a cognitive module for step and pattern capturing that includes, while a single request is being processed, capturing the steps taken and the generated logs. The cognitive module uses the captured steps and ontology trees to build a log interaction framework.

As used herein, "cognitive" is defined as pertaining to a system or process that provides artificial intelligence capabilities that perform machine learning tasks. As used herein, "cognitive" and its variants are not to be construed as being or pertaining to mental processes or concepts performed in the human mind.

System for Tracking a Single Process Instance by Collating Multi-System Logs

Figure 1:
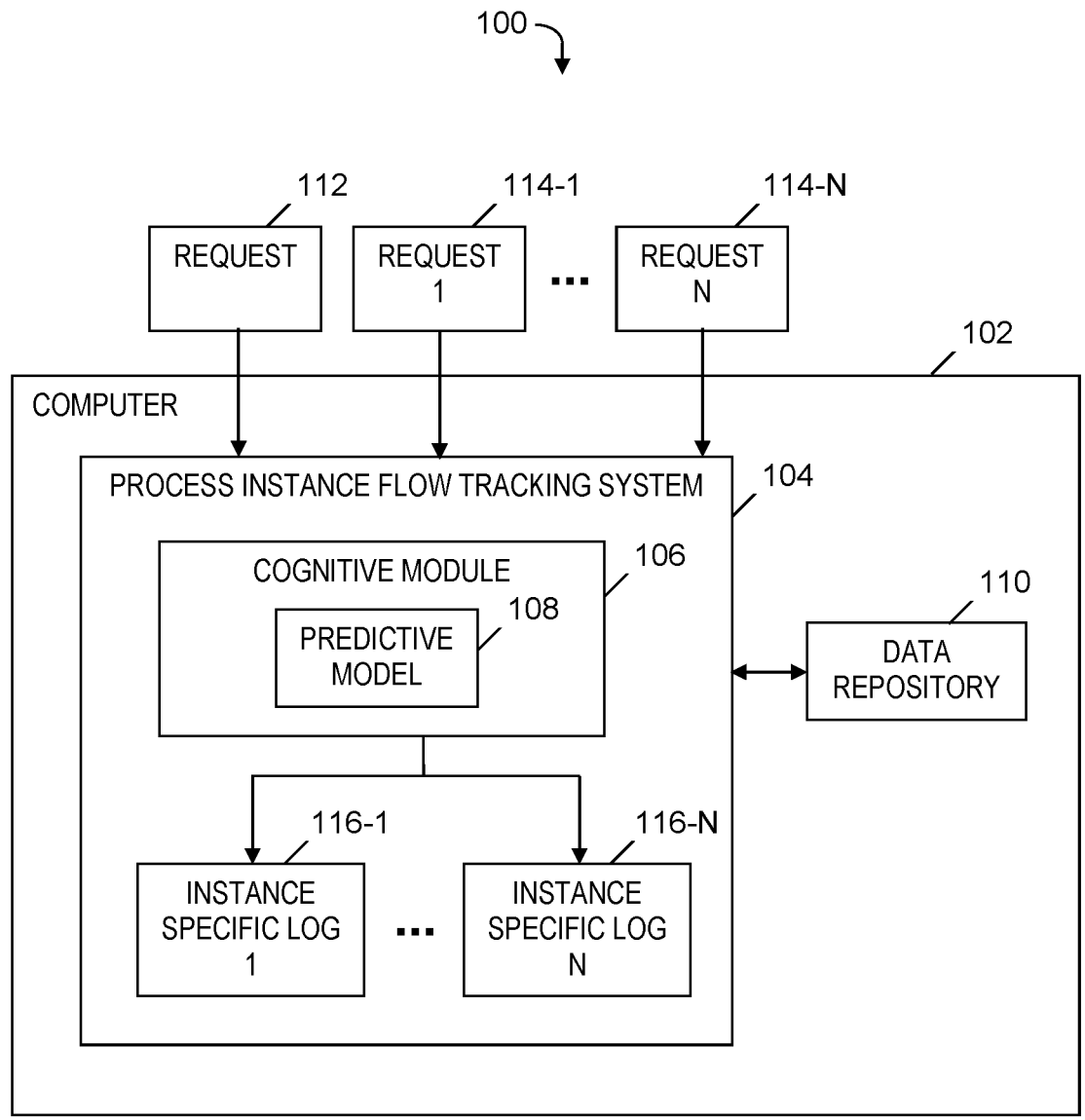
FIG. 1 is a block diagram of a system for tracking a flow of a single process instance by collating multi-system logs, in accordance with embodiments of the present invention.

FIG. 1 is a block diagram of a system 100 for tracking a flow of a single process instance by collating multi-system logs, in accordance with embodiments of the present invention. System 100 includes a computer 102, which executes a software-based process instance flow tracking system 104, which includes a cognitive module 106, which includes a predictive model 108. Process instance flow tracking system 104 is operatively coupled to a data repository 110.

In a training phase, process instance flow tracking system 104 receives a request 112. As request 112 is processed in multiple systems in a multi-system environment, process instance flow tracking system 104 captures all the log entries for the processing of request 112 and sends the log files that include the captured log entries to a training corpus stored in data repository 110. Process instance flow tracking system 104 identifies associated identifiers and matching variables in each system in which request 112 is processed. Process instance flow tracking system 104 sends the identified associated identifiers and matching variables to the training corpus.

In the training phase, cognitive module 106 flattens the log files for request 112 into a single chronological log and builds predictive model 108 from an order of the entries in the single chronological log. Based on the information in the training corpus stored in data repository 110, cognitive module 106 identifies correlation keys in the log entries of the single chronological log.

In a live production phase, process instance flow tracking system 104 receives N requests 114-1, . . . , 114-N, where N is an integer greater than one. A log analysis store in data repository 110 stores a single combined chronological log file that includes entries from log files from the multiple systems that process the requests 114-1, . . . , 114-N. The single combined chronological log file is also referred to herein as an aggregated log. Process instance flow tracking system 104 uses a pattern detection algorithm (not shown) and an alternate identifier algorithm (not shown) for the single combined chronological log file pulled from data repository 110 to separate instances from the single combined chronological log file and predict the log entries that belong to respective instances. Cognitive module 106 uses predictive model 108 to deflatten the single combined chronological log file to the N instance specific logs 116-1, . . . , 116-N.

The functionality of the components shown in FIG. 1 is described in more detail in the discussion of FIG. 2, FIG. 3, FIG. 4, FIGS. 5A-5B, FIG. 6, and FIG. 7 presented below.

Process for Tracking a Single Process Instance by Collating Multi-System Logs

Figure 2:
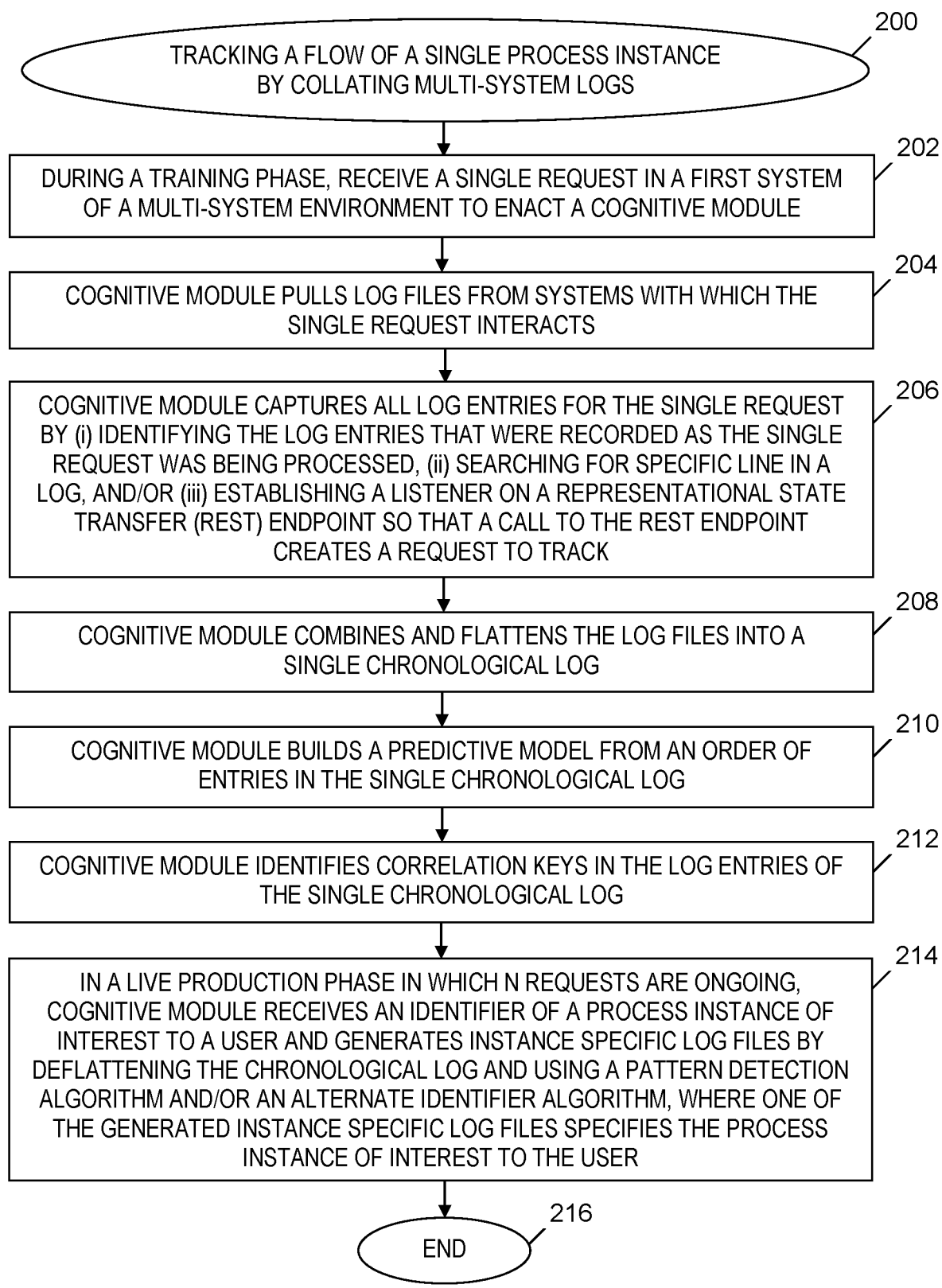
FIG. 2 is a flowchart of a process of tracking a flow of a single process instance by collating multi-system logs, where the process is implemented in the system of FIG. 1, in accordance with embodiments of the present invention.

FIG. 2 is a flowchart of a process of tracking a single process instance flow by collating multi-system logs, where the process is implemented in the system of FIG. 1, in accordance with embodiments of the present invention. The process of FIG. 2 starts at step 200. In step 202, during a training phase, process instance flow tracking system 104 (see FIG. 1) receives a single request (i.e., request 112 in FIG. 1) in a first system of a multi-system environment to enact cognitive module 106 (see FIG. 1). Step 202 also includes cognitive module 106 (see FIG. 1) being enacted in response to (i) the request 112 (see FIG. 1) being received and (ii) process instance flow tracking system 104 (see FIG. 1) determining that there are no other ongoing instances in any system of the multi-system computing environment. In one or more embodiments, the condition of having no other ongoing instances is satisfied by single-threading the systems either by manually queueing up the inputs or by automatically not permitting more than one instance to be processed at once. The training phase continues through steps 204-212 described below.

In step 204, cognitive module 106 (see FIG. 1) pulls log files from the systems in the multi-system environment with which request 112 (see FIG. 1) interacts. For example, cognitive module 106 (see FIG. 1) pulls a log file by using manual linkage through a designated path or Uniform Resource Locator (URL).

In step 206, cognitive module 106 (see FIG. 1) captures all log entries for request 112 (see FIG. 1) by (i) identifying the log entries that were recorded as request 112 (see FIG. 1) was being processed by systems in the multi-system environment; (ii) searching for a specific line (e.g., "Request Received") in a log based on the specific line being set manually or the specific line being learned by a machine learning system in cognitive module 106 (see FIG. 1) that is trained by receiving multiple requests, and/or (iii) establishing a listener on a representational state transfer (REST) endpoint so that a call to the REST endpoint creates a request to track the request 112 (see FIG. 1). In one embodiment, the aforementioned identification of log entries is based on a comparison between log entries that occur when request 112 (see FIG. 1) is being processed and log entries that occur without request 112 (see FIG. 1) being processed. The search for the aforementioned specific line in a log can use a line that is manually set or that cognitive module 106 (see FIG. 1) learns after completing training based on receiving multiple requests.

In step 208, cognitive module 106 (see FIG. 1) combines and flattens the log files into a single chronological log.

In step 210, cognitive module 106 (see FIG. 1) builds predictive model 108 (see FIG. 1) from an order of entries in the single chronological log. In one embodiment, cognitive module 106 (see FIG. 1) uses a building and updating of predictive model 108 (see FIG. 1) in repeated performances of the process of FIG. 2 to generate a learned pattern of log entries that are expected to follow other log entries.

In step 212, cognitive module 106 (see FIG. 1) identifies correlation keys in the log entries of the single chronological log. In one embodiment, cognitive module 106 (see FIG. 1) uses machine learning to determine associations between identifiers or variables in log files generated by different systems. For example, cognitive module 106 (see FIG. 1) determines that AccountNum in log 1 from System 1 refers to AccountVal in log 2 from System 2.

In one or more embodiments, cognitive module 106 (see FIG. 1) in step 212 performs a value comparison or a simple index search to identify a correlation key. As an example of a value comparison in step 212, if cognitive module 106 (see FIG. 1) determines that BoSys1 equals '#4567' and BoSys2 equals '#4567', then cognitive module 106 (see FIG. 1) determines that the entries are correlated. As an example of a simple index search in step 212, cognitive module 106 (see FIG. 1) determines that a shared portion of boName account-Num index matches accountVal.

In one embodiment, step 212 also includes cognitive module 106 (see FIG. 1) associating correlated services and strengthening predictive model 108 (see FIG. 1) via the correlated services. For example, if cognitive module 106 (see FIG. 1) determines that an attribute in sys1 (i.e., a first system) matches an attribute in sys2 (i.e., a second system), then cognitive module 106 (see FIG. 1) uses the matching attributes to strengthen and successfully train the predictive model 108 (see FIG. 1) (e.g., if sys1BO.accountNum equals sys2BO.accountVal then the resiliency of predictive model 108 (see FIG. 1) is strengthened).

In step 214, in a live production phase in which N requests are ongoing, cognitive module 106 (see FIG. 1) receives an identifier of a process instance of interest to a user and generates instance specific log files 116-1, . . . , 116-N (see FIG. 1) by deflattening an aggregated log resulting from combining logs that were generated for multiple requests processed in systems in the multi-system computing environment. In one embodiment, cognitive module 106 (see FIG. 1) uses a pattern detection algorithm and/or an alternate identifier algorithm in predictive model 108 (see FIG. 1) to deflatten the aggregated log. One of the generated instance specific log files 116-1, . . . , 116-N specifies the process instance of interest to the user.

One example of applying the alternate identifier algorithm uses the following pseudocode and scenario:

Sys 1 - - - - - - - - - - - - - - - - - - - - - -Object

Initial and Sent Item="{\"uid\":\"1234\",\"startDate\": \"2019-03-07T02:45:26.585Z\",\"source\":\"IBM BPM\", \"provider\":\"IBM\",\"category\":\"VM Creation\",\"systemID\":\"IBMVM03\",\"location\":\"Austin\"}"

Sys 2 - - - - - - - - - - - - - - - - - - - - -Mapped Obj

Receiving Item="{\"uid\":\"1234\",\"startDate\":\"2019-03-07T02:45:26.585Z\",\"source\":\"IBM BPM\",\"provider\":\"IBM\",\"category\":\"VM Creation\",\"systemID\":\"IBMVM03\",\"location\":\"Austin\"}";

Used Item='{refID': 'IBMVM03', 'catType': '005', 'loc': '02'}

Return to Sys 1={'200 Res'}

In a scenario using the pseudocode presented above, cognitive module 106 (see FIG. 1) performs the following: (1) capture the mapping of objSys1.systemID==objSys2.refId via an index search or index match for partial or full completeness; (2) associate objSys1.category objSys2.catType via machine learning provided by cognitive module 106 (see FIG. 1), where all VM creation categories are detected and mapped as catType 005 through multiple requests; and (3) associate objSys1.location~objSys2.loc via the machine learning provided by cognitive module 106 (see FIG. 1), where all "Austin" requests are mapped as loc 02 via the machine learning of the multiple requests where loc is always 02 when location is Austin. The associated values are correlation values (i.e., correlation keys) that process instance flow tracking system 104 (see FIG. 1) can use when searching through aggregated logs to identify the requests from Sys1 that match with requests from Sys2.

One example of applying the pattern detection algorithm tracks expected steps in lines of a log after combining all log files. Cognitive module 106 (see FIG. 1) uses an ontology tree or decision tree to capture a next associated step after a given log line (i.e., determine the step that is expected to follow the step in the given log line). The nodes of the ontology tree include log entries and the branching of the ontology tree indicates possible subsequent step(s) (i.e., output(s)) for each step and the order of steps specified by log entries.

After step 214, the process of FIG. 2 ends at step 216.

In one embodiment, during a training phase in step 212, cognitive module 106 (see FIG. 1) identifies identifiers and variables in log entries generated by one system in the multi-system computing environment that correlate to respective identifiers and variables in other log entries generated by another system in the multi-system computing environment. Cognitive module 106 (see FIG. 1) trains on a corpus based on the identifiers and variables in the one system that correlate to the identifiers and variables in the other system. Based on the corpus and using the alternate identifier algorithm in step 214, cognitive module 106 (see FIG. 1) predicts log entries in the aggregated log that belong to respective process instances. The generation of the instance specific log files in step 214 is based on the log entries that are predicted to belong to the respective process instances.

In one embodiment, during a training phase in step 210, cognitive module 106 (see FIG. 1) identifies one line in the single chronological log that is processed following another line in the single chronological log, where the one line and the other line belonging to one process instance. Cognitive module 106 (see FIG. 1) updates an ontology tree by adding the other line to the ontology tree. The ontology tree indicates a branching of steps in the one process instance. Based on the pattern detection algorithm in step 214 and the updated ontology tree, cognitive module 106 (see FIG. 1) predicts log entries in the aggregated log that belong to respective process instances. The generation of the instance specific log files in step 214 is based on the log entries that are predicted to belong to the respective process instances.

In an alternate embodiment, process instance flow tracking system 104 (see FIG. 1) determines that one or more entries in one of the instance specific logs 116-1, . . . , 116-N (see FIG. 1) generated in step 214 specify a divergence from expected behavior, where the expected behavior is derived from predictive model 108 (see FIG. 1). In one embodiment, process instance flow tracking system 104 (see FIG. 1) highlights the one or more entries that diverge from the expected behavior, and the highlighted one or more entries are displayed for viewing by a user. A user who is debugging code associated with a particular request uses process instance flow tracking system 104 (see FIG. 1) to generate an instance specific log for the process instance that resulted from the request (i.e., generates instance specific log 116-1 (see FIG. 1)). The user who is debugging views instance specific log 116-1 (see FIG. 1) to identify log entries associated with the code problems associated with the request. The highlighted entries in instance specific log 116-1 (see FIG. 1) directs the user's attention to portions of the log that are likely to be associated with the code problems, thereby allowing the user to identify a root cause of the problem.

Training Phase Example

Figure 3:
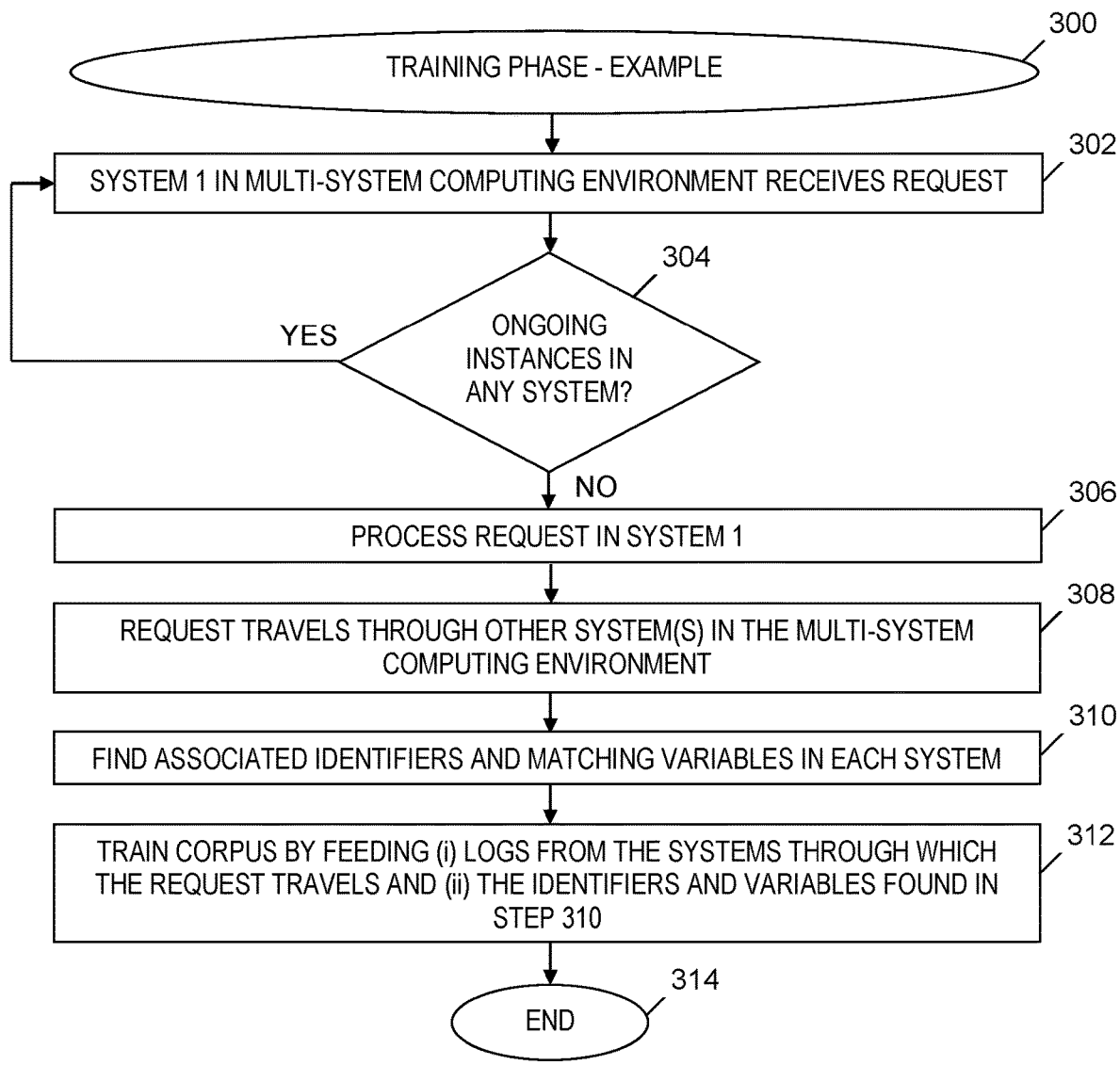
FIG. 3 is a flowchart of a training phase included in the process of FIG. 2, in accordance with embodiments of the present invention.

FIG. 3 is a flowchart of an example of a training phase included in the process of FIG. 2, in accordance with embodiments of the present invention. The training phase example starts at step 300. In step 302, System 1 in a multi-system computing environment receives request 112 (see FIG. 1). Process instance flow tracking system 104 (see FIG. 1) determines whether there are ongoing instances in any system in the multi-system computing environment (i.e., instances associated with requests other than request 112 (see FIG. 1)). If process instance flow tracking system 104 (see FIG. 1) determines in step 304 that there are ongoing instances, then the Yes branch of step 304 is followed and the process loops back to step 302 to receive a subsequent request.

If process instance flow tracking system 104 (see FIG. 1) determines in step 304 that there are no ongoing instances in any system in the multi-system computing environment, then the No branch of step 304 is followed and step 306 is performed.

In step 306, System 1 processes request 112 (see FIG. 1). In step 308, request 112 (see FIG. 1) travels through other system(s) in the multi-system computing environment where request 112 (see FIG. 1) is further processed.

In step 310, process instance flow tracking system 104 (see FIG. 1) identifies associated identifiers and matching variables in each system in which request 112 (see FIG. 1) was processed.

In step 312, process instance flow tracking system 104 (see FIG. 1) trains a corpus by feeding the corpus (i) logs from the systems through which request 112 (see FIG. 1) traveled and (ii) the identifies and variables identified in step 310.

After step 310, the process of FIG. 3 ends at step 314.

Live Production Environment Phase Example

Figure 4:
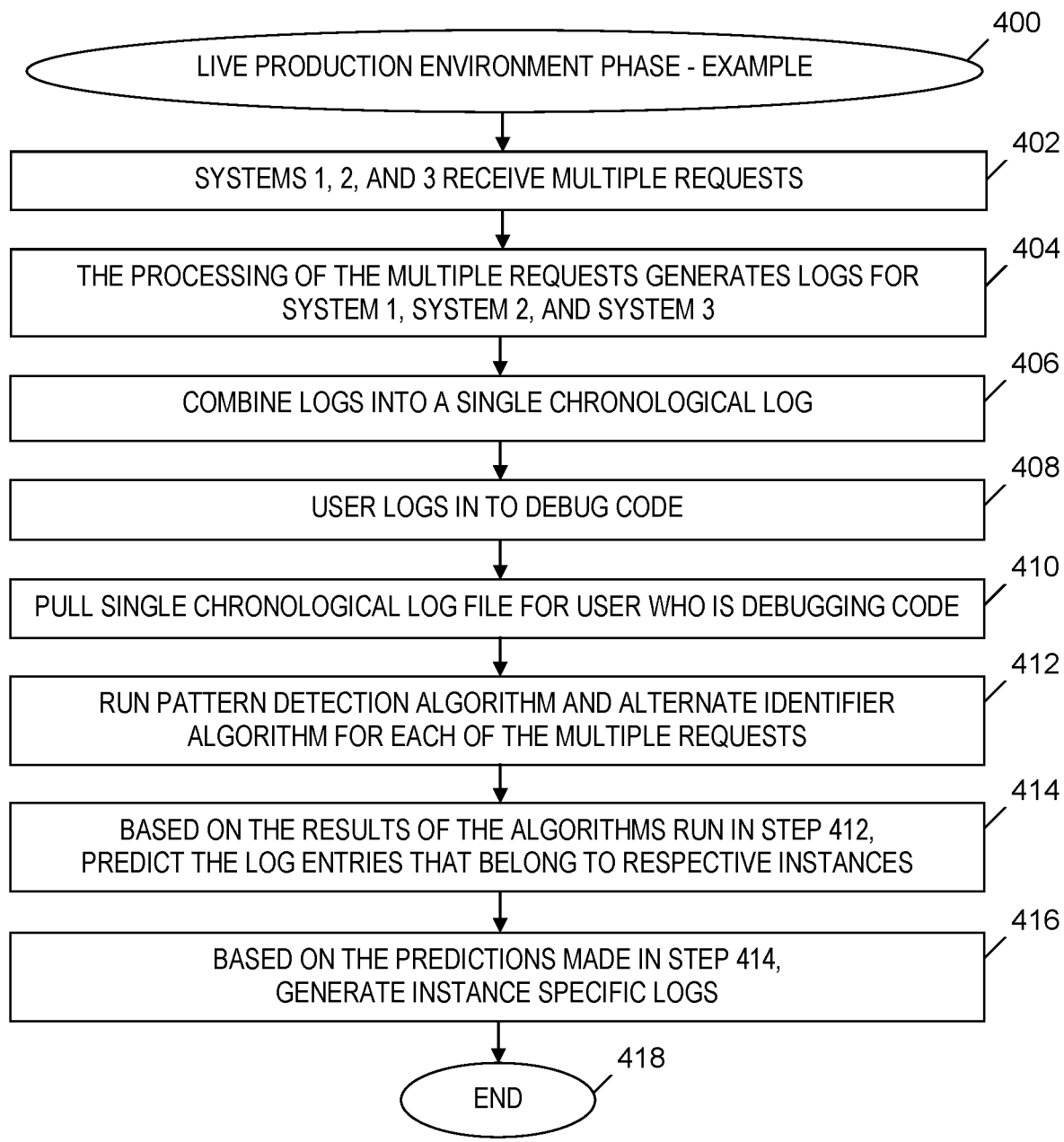
FIG. 4 is a flowchart of a live production environment phase included in the process of FIG. 2, in accordance with embodiments of the present invention.

FIG. 4 is a flowchart of an example of a live production environment phase included in the process of FIG. 2, in accordance with embodiments of the present invention. The process of FIG. 4 starts at step 400. In step 402, Systems 1, 2, and 3 receive multiple requests 114-1, . . . , 114-N (see FIG. 1).

In step 404, the processing of requests 114-1, . . . , 114-N (see FIG. 1) in Systems 1, 2, and 3 generates logs for Systems 1, 2, and 3.

In step 406, process instance flow tracking system 104 (see FIG. 1) combines the logs into a single chronological log.

In step 408, process instance flow tracking system 104 (see FIG. 1) detects that a user has logged in to debug code.

In step 410, process instance flow tracking system 104 (see FIG. 1) pulls the single chronological log file for the user who is debugging code.

In step 412, process instance flow tracking system 104 (see FIG. 1) runs the pattern detection algorithm and the alternate identifier algorithm for each of the requests 114-1, . . . , 114-N (see FIG. 1).

In step 414, based on the results of the algorithms run in step 412, process instance flow tracking system 104 (see FIG. 1) predicts the log entries that belong to respective instances.

In step 416, based on the predications made in step 414, process instance flow tracking system 104 (see FIG. 1) generates instance specific logs 116-1, . . . , 116-N (see FIG. 1).

After step 416, the process of FIG. 4 ends at step 418.

Figure 5A:
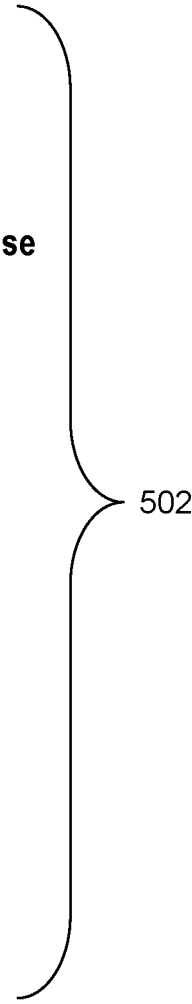
FIGS. 5A-5B depict an example of generating instance specific log files in the process of FIG. 2, in accordance with embodiments of the present invention.
Figure 5B:
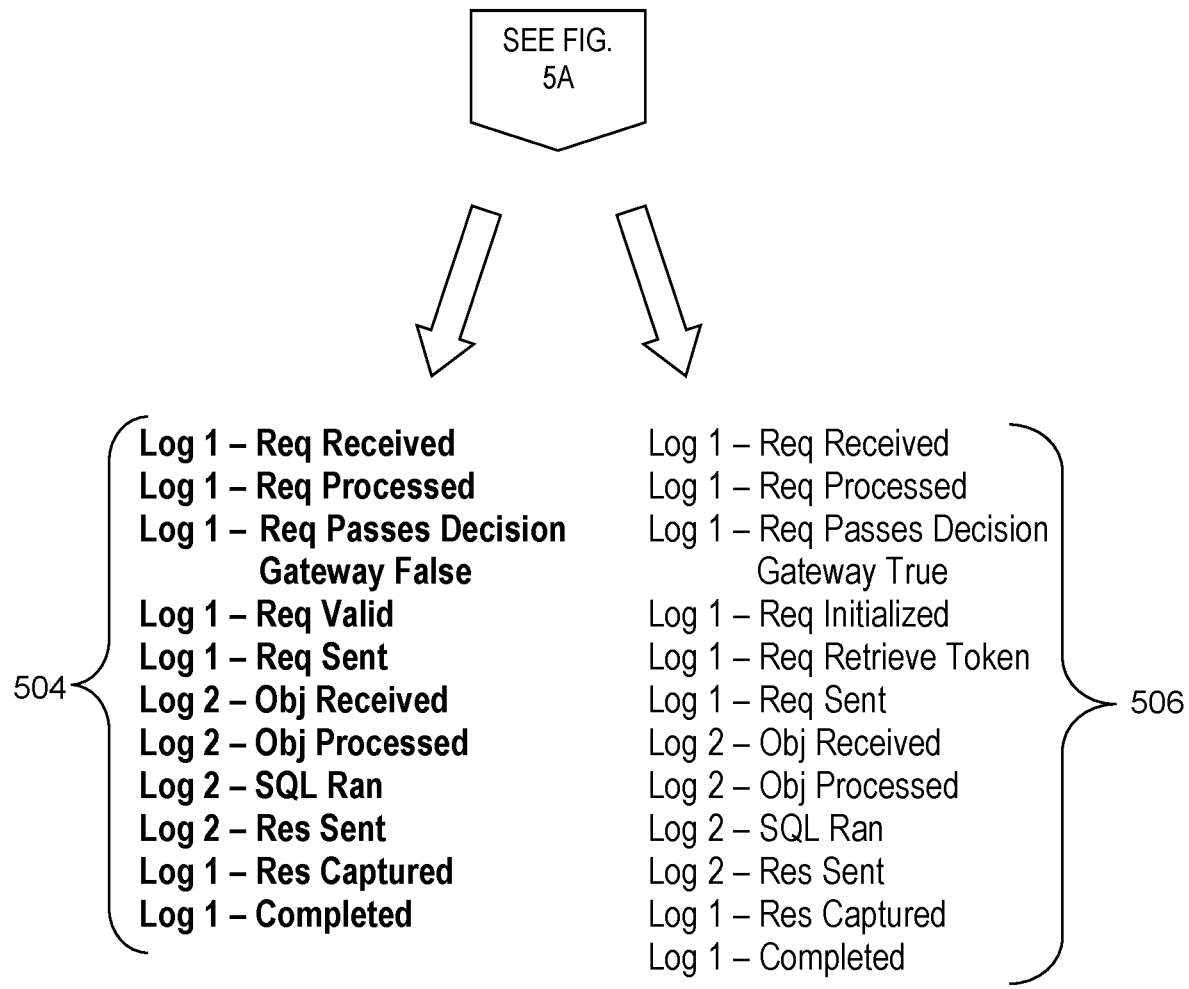

FIGS. 5A-5B depict an example of generating instance specific log files in the process of FIG. 2, in accordance with embodiments of the present invention. A combination of log entries 502 that include (i) first log entries for a first process instance (i.e., the log entries shown in boldface in FIG. 5A) and (ii) second log entries for a second process instance (i.e., the log entries in regular (non-boldface) typeface in FIG. 5A), where at least portions of the first and second process instances occur during the same period of time. In combination of log entries 502, "Log 1" indicates a log entry outputted from processing that occurs in System 1 and "Log 2" indicates a log entry outputted from processing that occurs in System 2. Using predictive model 108 (see FIG. 1), process instance flow tracking system 104 (see FIG. 1) processes the log entries in combination 502 to determine the process instances to which the log entries belong. Process instance flow tracking system 104 (see FIG. 1) generates a first instance specific log file 504 in FIG. 5B that consists of log entries that belong to the first process instance and a second instance specific log file 506 that consists of log entries that belong to the second process instance. Instance specific log files 504 and 506 are examples of instance specific log files generated by step 214 (see FIG. 2).

Figure 6:
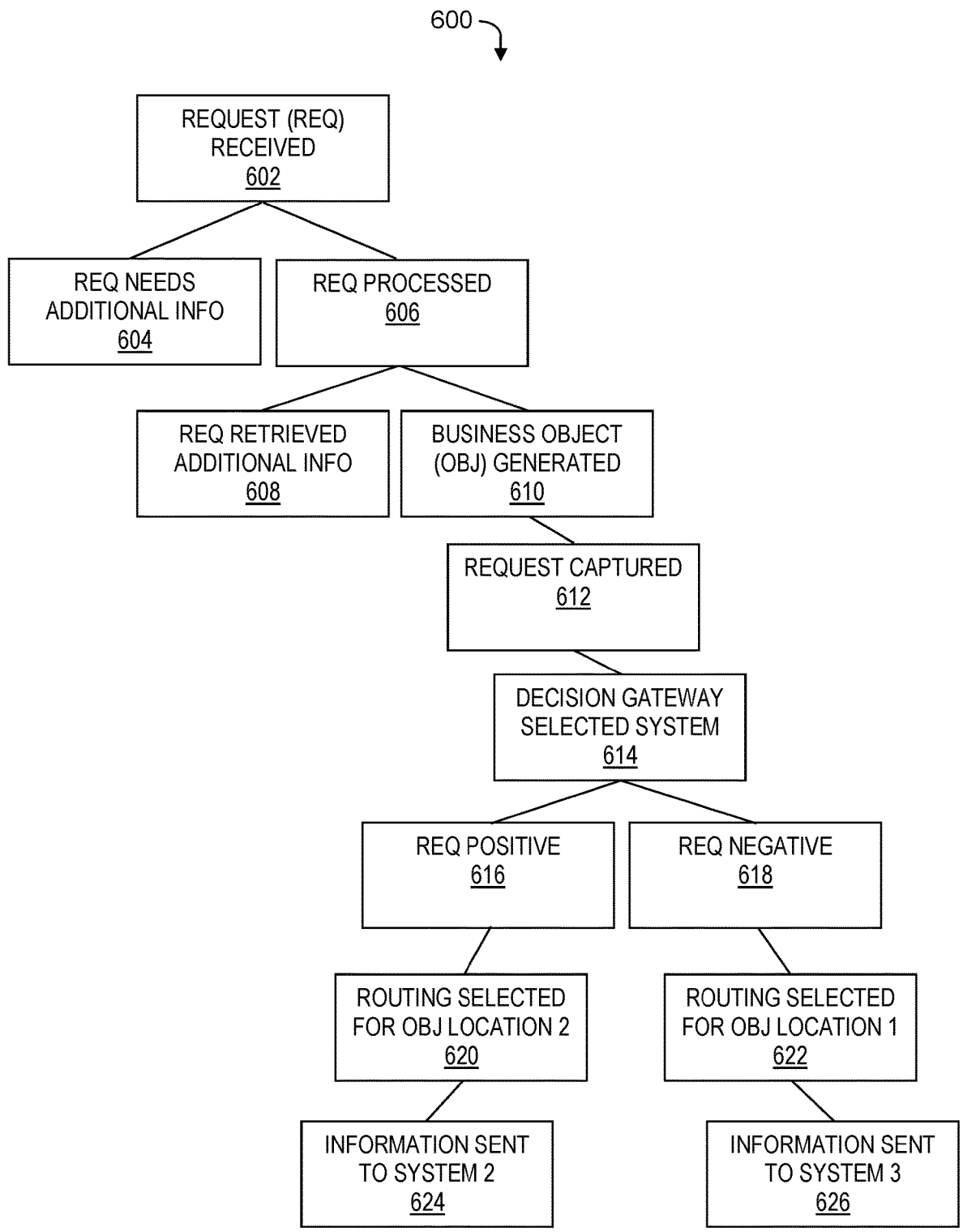
FIG. 6 is an ontology tree that provides pattern detection and prediction in the process of FIG. 2, in accordance with embodiments of the present invention.

FIG. 6 is an ontology tree 600 that provides pattern detection and prediction in the process of FIG. 2, in accordance with embodiments of the present invention. Ontology tree 600 includes nodes representing steps in log entries. The arrangement of nodes in ontology tree 600 indicates the next associated step(s) that can follow a given log entry line. For example, a log entry of Request (Req) Received 602 can be followed by Req needs additional info 604 or Req processed 606. Furthermore, Req processed 606 can be followed by Req retrieved additional info 608 or Business object (obj) generated 610.

Moreover, Business object (obj) generated 610 can be followed by Request captured 612, which can be followed by Decision gateway selected system 614. Two possible log entries following Decision gateway selected system 614 are Req positive 616 and Req negative 618.

Req positive 616 can be followed by node 620 (i.e., Routing selected for obj location 2). Req negative 618 can be followed by node 622 (i.e., Routing selected for obj location 1).

Routing selected for obj location 2 can be followed by node 624 (i.e., Information sent to System 2). Routing selected for obj location 1 can be followed by node 626 (i.e., Information sent to System 3).

Ontology tree 600 is an example of a result of building predictive model 108 (see FIG. 1) in step 210 (see FIG. 2).

Debug Example

Jim sends a request that attempts to provision a virtual machine (VM). If performed successfully, the process steps of the provisioning include: (i) A business processing management system receives the request and four other requests on different threads; (ii) the business processing management system sends the request to the orchestrating engine (i.e., orchestrator), (iii) the orchestrating engine receives the requests, and then searches and associates data in the requests to the appropriate geography, (iv) the orchestrating engine forwards the requests to a VM creator which spawns the VM instance in the geography, and (v) the VM returns the message to the orchestrating engine, which then returns the message to the business processing management system, which then returns a pop-up on the screen indicating "VM Provisioned."

The actual steps include an error because the VM provision fails and Jim receives a client-side warning. Jim notifies the support team which includes Zach. A conventional approach includes Zach gathering the request number and other information from Jim and performing manual investigations that identify log entries that include the request number and other log entries that have correlation keys. Zach also determines through manual investigation the logs that have no correlation keys at all. Furthermore, in the conventional approach, Zach may determine that the request was sent correctly but a good response was not received from an orchestrator. Zach then has to communicate with Andy, who is in charge of the orchestrator, and Andy searches log files of the orchestrator to determine where the error occurs.

Instead of the conventional approach described above, Zach uses system 100 in FIG. 1 and the process of FIG. 2 to make queries based on a single identifier from Jim's instance, and process instance flow tracking system 104 (see FIG. 1) responds with the instance specific log 116-1 (see FIG. 1) that is derived from the multiple log files of the systems which processed the request. Process instance flow tracking system 104 (see FIG. 1) also highlights the log entries in the instance specific log 116-1 (see FIG. 1) that diverge from expected log entries. Using the instance specific log 116-1 (see FIG. 1) and the highlighted entries, Zach identifies the error.

Computer System

Figure 7:
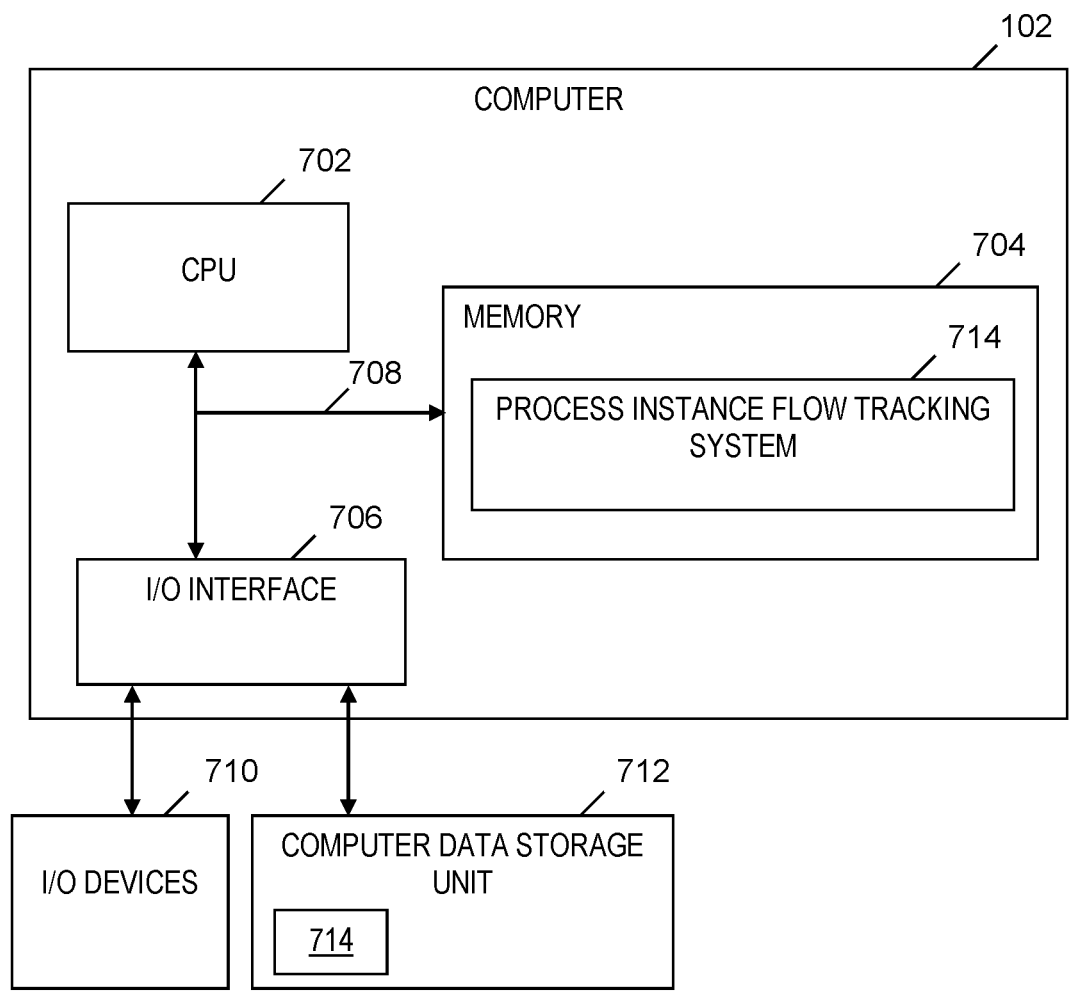
FIG. 7 is a block diagram of a computer that is included in the system of FIG. 1 and that implements the process of FIG. 2, in accordance with embodiments of the present invention.

FIG. 7 is a block diagram of a computer that is included in the system of FIG. 1 and that implements the process of FIG. 2, in accordance with embodiments of the present invention. Computer 102 is a computer system that generally includes a central processing unit (CPU) 702, a memory 704, an input/output (I/O) interface 706, and a bus 708. Further, computer 102 is coupled to I/O devices 710 and a computer data storage unit 712. CPU 702 performs computation and control functions of computer 102, including executing instructions included in program code 714 for a system that includes process instance flow tracking system 104 (see FIG. 1) to perform a method of tracking a flow of a single process instance by collating multi-system logs, where the instructions are executed by CPU 702 via memory 704. CPU 702 may include a single processing unit or be distributed across one or more processing units in one or more locations (e.g., on a client and server).

Memory 704 includes a known computer readable storage medium, which is described below. In one embodiment, cache memory elements of memory 704 provide temporary storage of at least some program code (e.g., program code 714) in order to reduce the number of times code must be retrieved from bulk storage while instructions of the program code are executed. Moreover, similar to CPU 702, memory 704 may reside at a single physical location, including one or more types of data storage, or be distributed across a plurality of physical systems in various forms. Further, memory 704 can include data distributed across, for example, a local area network (LAN) or a wide area network (WAN).

I/O interface 706 includes any system for exchanging information to or from an external source. I/O devices 710 include any known type of external device, including a display, keyboard, etc. Bus 708 provides a communication link between each of the components in computer 102, and may include any type of transmission link, including electrical, optical, wireless, etc.

I/O interface 706 also allows computer 102 to store information (e.g., data or program instructions such as program code 714) on and retrieve the information from computer data storage unit 712 or another computer data storage unit (not shown). Computer data storage unit 712 includes a known computer readable storage medium, which is described below. In one embodiment, computer data storage unit 712 is a non-volatile data storage device, such as, for example, a solid-state drive (SSD), a network-attached storage (NAS) array, a storage area network (SAN) array, a magnetic disk drive (i.e., hard disk drive), or an optical disc drive (e.g., a CD-ROM drive which receives a CD-ROM disk or a DVD drive which receives a DVD disc).

Memory 704 and/or storage unit 712 may store computer program code 714 that includes instructions that are executed by CPU 702 via memory 704 to track a flow of a single process instance by collating multi-system logs. Although FIG. 7 depicts memory 704 as including program code, the present invention contemplates embodiments in which memory 704 does not include all of code 714 simultaneously, but instead at one time includes only a portion of code 714.

Further, memory 704 may include an operating system (not shown) and may include other systems not shown in FIG. 7.

In one embodiment, computer data storage unit 712 includes data repository 110.

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to tracking a flow of a single process instance by collating multi-system logs. Thus, an embodiment of the present invention discloses a process for supporting computer infrastructure, where the process includes providing at least one support service for at least one of integrating, hosting, maintaining and deploying computer-readable code (e.g., program code 714) in a computer system (e.g., computer 102) including one or more processors (e.g., CPU 702), wherein the processor(s) carry out instructions contained in the code causing the computer system to track a flow of a single process instance by collating multi-system logs. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of tracking a flow of a single process instance by collating multi-system logs.

While it is understood that program code 714 for tracking a flow of a single process instance by collating multi-system logs may be deployed by manually loading directly in client, server and proxy computers (not shown) via loading a computer-readable storage medium (e.g., computer data storage unit 712), program code 714 may also be automatically or semi-automatically deployed into computer 102 by sending program code 714 to a central server or a group of central servers. Program code 714 is then downloaded into client computers (e.g., computer 102) that will execute program code 714. Alternatively, program code 714 is sent directly to the client computer via e-mail. Program code 714 is then either detached to a directory on the client computer or loaded into a directory on the client computer by a button on the e-mail that executes a program that detaches program code 714 into a directory. Another alternative is to send program code 714 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 714 is transmitted to the proxy server and then it is stored on the proxy server.

Another embodiment of the invention provides a method that performs the process steps on a subscription, advertising and/or fee basis. That is, a service provider can offer to create, maintain, support, etc. a process of tracking a flow of a single process instance by collating multi-system logs. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media)

(i.e., memory 704 and computer data storage unit 712) having computer readable program instructions 714 thereon for causing a processor (e.g., CPU 702) to carry out aspects of the present invention.

The computer readable storage medium can be a tangible device that can retain and store instructions (e.g., program code 714) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 714) described herein can be downloaded to respective computing/processing devices (e.g., computer 102) from a computer readable storage medium or to an external computer or external storage device (e.g., computer data storage unit 712) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 714) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2, FIG. 3, and FIG. 4) and/or block diagrams (e.g., FIG. 1 and FIG. 7) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 714).

These computer readable program instructions may be provided to a processor (e.g., CPU 702) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 712) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 714) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method comprising:
during a training phase, receiving, by one or more processors, a single request in a first system of a multi-system computing environment to enact a cognitive module;
using the cognitive module, pulling, by the one or more processors, log files from systems with which the single request interacts, the systems being included in the multi-system computing environment;
using the cognitive module, capturing, by the one or more processors, log entries for the single request;
using the cognitive module, combining and flattening, by the one or more processors, the log files into a single chronological log;
using the cognitive module, building, by the one or more processors, a predictive model from an order of entries in the single chronological log;
using the cognitive module, identifying, by the one or more processors, correlation keys in the entries of the single chronological log; and
during a live production phase in which requests in multiple process instances are ongoing in the multi-system computing environment, the one or more processors performing steps of aggregating logs specifying a processing of the requests by multiple systems in the multi-system computing environment, receiving an identifier of a process instance of interest to a user, and generating instance specific log files by deflattening the aggregated logs by using a pattern detection algorithm that uses the predictive model and an alternate identifier algorithm that uses the correlation keys, one of the generated instance specific log files specifying a flow of the process instance of interest to the user.

2. The method of claim 1, wherein the capturing the log entries for the single request includes identifying the log entries as being entries that are recorded as the single request is being processed by one or more systems in the multi-system computing environment and identifying the log entries as not being included in other entries that are not associated with the single request being processed.

3. The method of claim 1, wherein the capturing the log entries for the single request includes searching for a specific line in a log based on the specific line being set manually or the specific line being learned by a machine learning system that is trained by receiving multiple requests.

4. The method of claim 1, wherein the capturing the log entries for the single request includes establishing a listener on a representational state transfer (REST) endpoint so that a call to the REST endpoint creates a request to track the single request.

5. The method of claim 1, further comprising:
during the training phase, identifying, by the one or more processors, identifiers and variables in one system that are associated to identifiers and variables in another system, the one system and the other system being included in the multi-system computing environment;
training, by the one or more processors, on a corpus based on the identifiers and variables in the one system that are associated to the identifiers and variables in the other system; and
based on the corpus and using the alternate identifier algorithm, predicting log entries in the aggregated log that belong to respective process instances, wherein the generating the instance specific log files is based on the log entries that are predicted to belong to the respective process instances.

6. The method of claim 1, further comprising:
during the training phase, identifying, by the one or more processors, one line in the single chronological log that is processed following another line in the single chronological log, the one line and the other line belonging to one process instance;
updating, by the one or more processors, an ontology tree by adding the other line to the ontology tree, the ontology indicating a branching of steps in the one process instance; and
based on the pattern detection algorithm and the updated ontology tree, predicting, by the one or more processors, log entries in the aggregated log that belong to respective process instances, wherein the generating the instance specific log files is based on the log entries that are predicted to belong to the respective process instances.

7. The method of claim 1, further comprising determining, by the one or more processors, that systems in the multi-system computing environment are processing the single request in isolation so that the single request is being processed as a single thread and no processing of another request is ongoing in the systems, wherein the pulling the log files is performed in response to the determining that the systems are processing the single request in isolation.

8. The method of claim 1, further comprising the step of:
providing at least one support service for at least one of creating, integrating, hosting, maintaining, and deploying computer readable program code in the computer, the program code being executed by a processor of the computer to implement the receiving the single request in the first system, the pulling the log files from the systems with which the single request interacts, the capturing the log entries for the single request, the combining and flattening the log files into the single chronological log, the building the predictive model, the identifying the correlation keys, and the performing the steps of (i) aggregating the logs specifying the processing of the requests, (ii) receiving the identifier of the process instance of interest to the user, and (iii) generating the instance specific log files.

9. A computer program product comprising:
one or more computer readable storage media having computer readable program code collectively stored on the one or more computer readable storage media, the computer readable program code being executed by a central processing unit (CPU) of a computer system to cause the computer system to perform a method comprising:
during a training phase, the computer system receiving a single request in a first system of a multi-system computing environment to enact a cognitive module;
using the cognitive module, the computer system pulling log files from systems with which the single request interacts, the systems being included in the multi-system computing environment;

using the cognitive module, the computer system capturing log entries for the single request;
using the cognitive module, the computer system combining and flattening the log files into a single chronological log;
using the cognitive module, the computer system building a predictive model from an order of entries in the single chronological log;
using the cognitive module, the computer system identifying correlation keys in the entries of the single chronological log; and
during a live production phase in which requests in multiple process instances are ongoing in the multi-system computing environment, the computer system performing steps of aggregating logs specifying a processing of the requests by multiple systems in the multi-system computing environment, receiving an identifier of a process instance of interest to a user, and generating instance specific log files by deflattening the aggregated logs by using a pattern detection algorithm that uses the predictive model and an alternate identifier algorithm that uses the correlation keys, one of the generated instance specific log files specifying a flow of the process instance of interest to the user.

10. The computer program product of claim 9, wherein the capturing the log entries for the single request includes identifying the log entries as being entries that are recorded as the single request is being processed by one or more systems in the multi-system computing environment and identifying the log entries as not being included in other entries that are not associated with the single request being processed.

11. The computer program product of claim 9, wherein the capturing the log entries for the single request includes searching for a specific line in a log based on the specific line being set manually or the specific line being learned by a machine learning system that is trained by receiving multiple requests.

12. The computer program product of claim 9, wherein the capturing the log entries for the single request includes establishing a listener on a representational state transfer (REST) endpoint so that a call to the REST endpoint creates a request to track the single request.

13. The computer program product of claim 9, wherein the method further comprises:
during the training phase, the computer system identifying identifiers and variables in one system that are associated to identifiers and variables in another system, the one system and the other system being included in the multi-system computing environment;
the computer system training on a corpus based on the identifiers and variables in the one system that are associated to the identifiers and variables in the other system; and
based on the corpus and using the alternate identifier algorithm, predicting log entries in the aggregated log that belong to respective process instances, wherein the generating the instance specific log files is based on the log entries that are predicted to belong to the respective process instances.

14. The computer program product of claim 9, wherein the method further comprises:
during the training phase, the computer system identifying one line in the single chronological log that is processed following another line in the single chronological log, the one line and the other line belonging to one process instance;
the computer system updating an ontology tree by adding the other line to the ontology tree, the ontology tree indicating a branching of steps in the one process instance; and
based on the pattern detection algorithm and the updated ontology tree, the computer system predicting log entries in the aggregated log that belong to respective process instances, wherein the generating the instance specific log files is based on the log entries that are predicted to belong to the respective process instances.

15. A computer system comprising:
a central processing unit (CPU);
a memory coupled to the CPU; and
one or more computer readable storage media coupled to the CPU, the one or more computer readable storage media containing instructions that are executed by the CPU via the memory to implement a method comprising:
during a training phase, the computer system receiving a single request in a first system of a multi-system computing environment to enact a cognitive module;
using the cognitive module, the computer system pulling log files from systems with which the single request interacts, the systems being included in the multi-system computing environment;
using the cognitive module, the computer system capturing log entries for the single request;
using the cognitive module, the computer system combining and flattening the log files into a single chronological log;
using the cognitive module, the computer system building a predictive model from an order of entries in the single chronological log;
using the cognitive module, the computer system identifying correlation keys in the entries of the single chronological log; and
during a live production phase in which requests in multiple process instances are ongoing in the multi-system computing environment, the computer system performing steps of aggregating logs specifying a processing of the requests by multiple systems in the multi-system computing environment, receiving an identifier of a process instance of interest to a user, and generating instance specific log files by deflattening the aggregated logs by using a pattern detection algorithm that uses the predictive model and an alternate identifier algorithm that uses the correlation keys, one of the generated instance specific log files specifying a flow of the process instance of interest to the user.

16. The computer system of claim 15, wherein the capturing the log entries for the single request includes identifying the log entries as being entries that are recorded as the single request is being processed by one or more systems in the multi-system computing environment and identifying the log entries as not being included in other entries that are not associated with the single request being processed.

17. The computer system of claim 15, wherein the capturing the log entries for the single request includes searching for a specific line in a log based on the specific line being set manually or the specific line being learned by a machine learning system that is trained by receiving multiple requests.

18. The computer system of claim 15, wherein the capturing the log entries for the single request includes establishing a listener on a representational state transfer (REST) endpoint so that a call to the REST endpoint creates a request to track the single request.

19. The computer system of claim 15, wherein the method further comprises:
- during the training phase, the computer system identifying identifiers and variables in one system that are associated to identifiers and variables in another system, the one system and the other system being included in the multi-system computing environment;
- the computer system training on a corpus based on the identifiers and variables in the one system that are associated to the identifiers and variables in the other system; and
- based on the corpus and using the alternate identifier algorithm, predicting log entries in the aggregated log that belong to respective process instances, wherein the generating the instance specific log files is based on the log entries that are predicted to belong to the respective process instances.

20. The computer system of claim 15, wherein the method further comprises:
- during the training phase, the computer system identifying one line in the single chronological log that is processed following another line in the single chronological log, the one line and the other line belonging to one process instance;
- the computer system updating an ontology tree by adding the other line to the ontology tree, the ontology tree indicating a branching of steps in the one process instance; and
- based on the pattern detection algorithm and the updated ontology tree, the computer system predicting log entries in the aggregated log that belong to respective process instances, wherein the generating the instance specific log files is based on the log entries that are predicted to belong to the respective process instances.

* * * * *